(12) United States Patent
Koikara et al.

(10) Patent No.: US 8,136,147 B2
(45) Date of Patent: Mar. 13, 2012

(54) PRIVILEGE MANAGEMENT

(75) Inventors: George Mathew Koikara, Bangalore (IN); Vidya Ranganathan, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 1325 days.

(21) Appl. No.: 11/735,679

(22) Filed: Apr. 16, 2007

(65) Prior Publication Data

US 2008/0256606 A1    Oct. 16, 2008

(51) Int. Cl.
*G06F 7/04* (2006.01)
*G06F 15/16* (2006.01)
*G06F 17/30* (2006.01)
*H04L 29/06* (2006.01)

(52) U.S. Cl. ......... 726/4; 726/2; 726/3; 726/17; 726/27; 713/166

(58) Field of Classification Search ............ 726/3–4, 726/26, 17, 27; 713/166
See application file for complete search history.

(56) References Cited

U.S. PATENT DOCUMENTS

| | | | |
|---|---|---|---|
| 6,023,765 A | 2/2000 | Kuhn | |
| 6,748,580 B1* | 6/2004 | Sur et al. | 717/105 |
| 7,437,556 B2* | 10/2008 | Tucker et al. | 713/164 |
| 7,568,217 B1* | 7/2009 | Prasad et al. | 726/3 |
| 2004/0015701 A1 | 1/2004 | Flyntz | |
| 2005/0182963 A1 | 8/2005 | Phillips et al. | |
| 2007/0094716 A1* | 4/2007 | Farino et al. | 726/5 |
| 2007/0150630 A1* | 6/2007 | Armstrong et al. | 710/200 |
| 2008/0168063 A1* | 7/2008 | Whitson | 707/9 |
| 2009/0198698 A1* | 8/2009 | Bahrs et al. | 707/9 |
| 2009/0287837 A1* | 11/2009 | Felsher | 709/229 |
| 2009/0287935 A1* | 11/2009 | Aull et al. | 713/182 |

OTHER PUBLICATIONS

Ruan et al., "A formal graph based framework for supporting authorization delegations and conflict resolutions", International Journal of Information Security, vol. 1, No. 4, Jul. 2003, pp. 211-222.
He et al., "Multi level secret sharing scheme based on semigroup structures", Ruan Jian Xue Bao/Journal of Software, vol. 13, No. 2, Feb. 2002, pp. 168-175.

* cited by examiner

*Primary Examiner* — Michael Pyzocha
*Assistant Examiner* — Jing Sims
(74) *Attorney, Agent, or Firm* — Yee & Associates, P.C.; David A. Mims, Jr.

(57) ABSTRACT

A computer implemented method, apparatus, and computer program product for managing privileges on a data processing system. The process initiates a privilege monitor. All other entities in the data processing system are prevented from assigning privileges. The privilege monitor is the only entity authorized to assign privileges. The process monitors for requests for privileges. In response to detecting a request from a user for a privilege, the process selectively assigns the privilege to the user through the privilege monitor.

19 Claims, 4 Drawing Sheets

*FIG. 3*
*(PRIOR ART)*
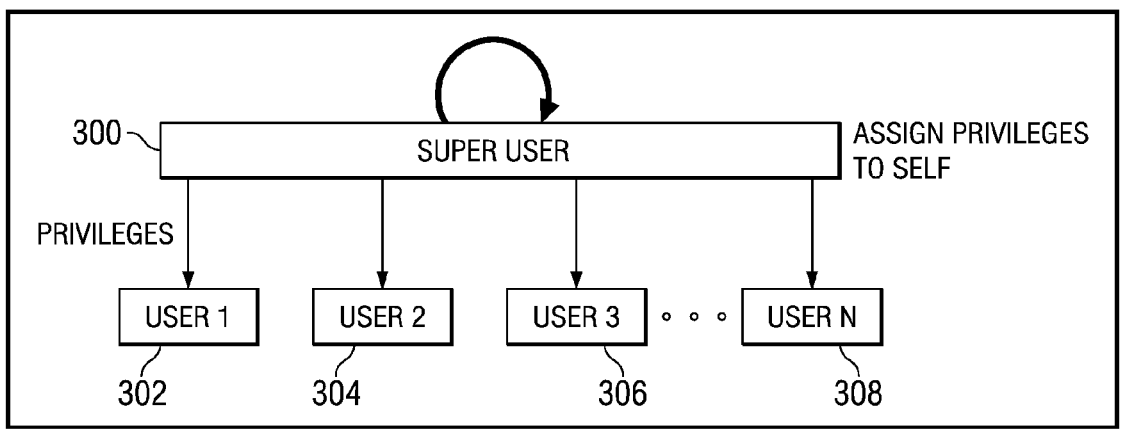
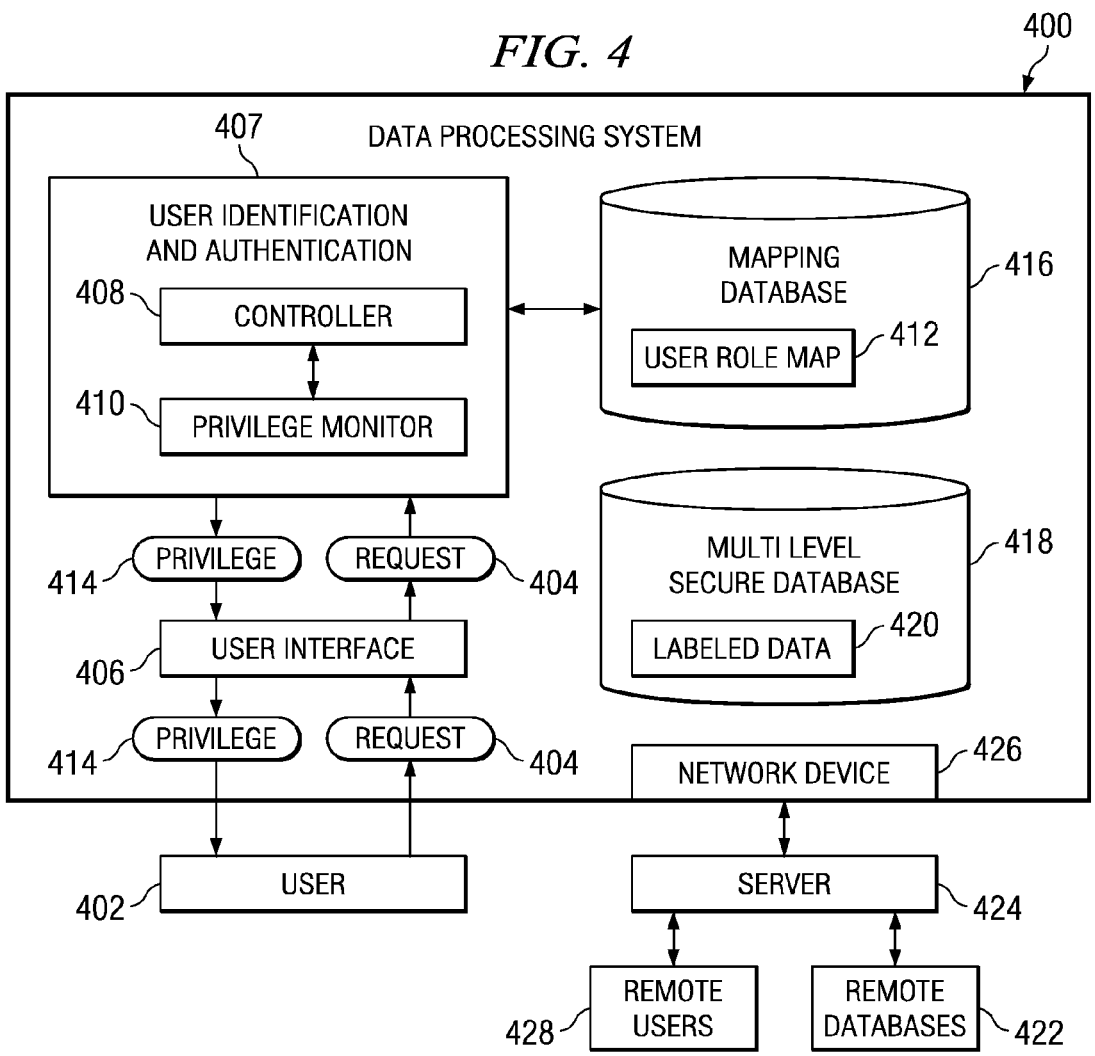
*FIG. 4*

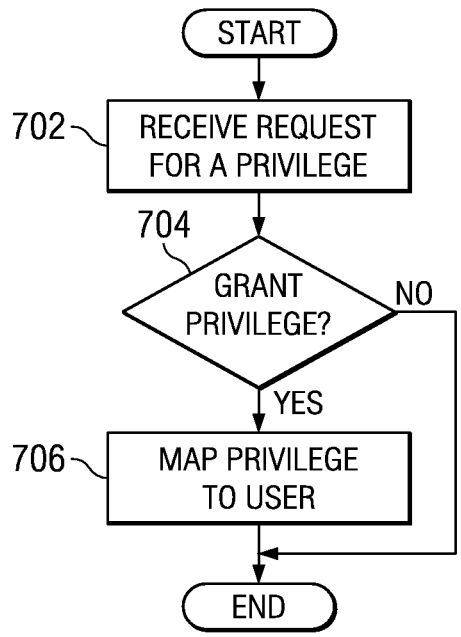
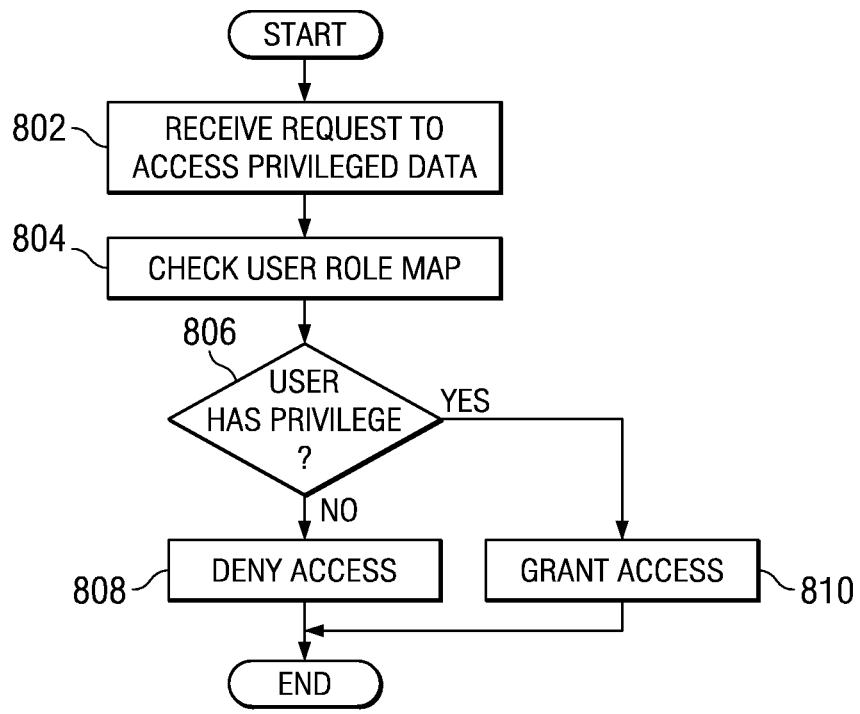

PRIVILEGE MANAGEMENT

BACKGROUND OF THE INVENTION

1. Field of the Invention

The present application is related generally to a data processing system and in particular to a method and apparatus for computer system security. More particularly, the present application is directed to a computer implemented method, apparatus, and computer usable program code for a privilege monitor for granting privileges to other entities but not to self.

2. Description of the Related Art

Building a secure computer system has become very challenging due to the advent of open source software (OSS). Open source software allows the public to obtain and freely use source code for operating systems, application software, and various other types of software code. Open source software has permitted computer professionals to obtain greater knowledge of program code for use in upgrading, modifying, personalizing, and debugging software. However, open source software has also permitted hackers and other malicious computer users to find new and better ways to break into otherwise secure computer systems.

Multi level security (MLS), also known as labeled security, provides a secure computer environment by controlling access to data and processes on a data processing system through mandatory access control (MAC). Mandatory access control is a mechanism that allows objects and subjects to be marked with labels, such as unclassified, classified, secret, and top secret. Thus, multi level security allows data to be separated into different sensitivities within a single operating environment by labeling data and processes with privilege labels. This type of labeling is of great significance in defense sectors, governments sectors, and financial organizations, such as banks.

To properly administer a secure computer system in an MLS environment, it is necessary to separate various administrative functions into distinct user or entity roles. For example, in a traditional UNIX environment, system administration allows all privileges and authorizations to be managed and regulated by a single user ID, generally referred to as a super-user or root user. However, in a role-based access control (RBAC) multi level system environment, the default system administration roles are the information system security officer (ISSO), the system administrator (SA), and the system operator (SO).

Each of the roles in a role-based access control system has certain privileges and authorizations assigned to them which allow the users with these roles to execute certain privileged programs or processes, and/or access privileged data. Certain normal privileges are automatically assigned to a given user when a user session is set up. Other privileges are generally assigned or granted explicitly based on a user request for access to the program, process, or data. The sessions of users with authorized roles are assigned or granted privileges only by the ISSO. No other role or entity has the ability to grant privileges to other roles or entities. The set of privileges granted to an entity can include, but is not limited to, login, read-only, write-only, read and write, file-system access, mandatory access control (MAC), input/output (I/O), discretionary access control (DAC), and many more.

An information system security officer or super user in a multi level security environment can assign some of the highest privileges to its own processes without permission from or intervention of any other administrators. This can become a problem if the information system security officer or super user account is compromised.

If a malicious user, such as a hacker, is able to infiltrate the information system security officer or super user account, the malicious user can gain unauthorized access to system resources. The malicious user can use information system security officer or super user authorization to elevate the malicious user's privileges in order to access any sensitive data and/or processes. The malicious user can also cause damage to the computer system and organization by de-activating auditing features and making changes to the computer system to enable the user to gain future access to the computer system without being detected.

Activities by malicious users have serious ramifications for the stability of a computer system which can result in the loss of data and system integrity. Moreover, the utilization of information system security officer and super user authorizations by a malicious user to grant privileges to the malicious user without alerting other administrative roles or entities defeats the purpose of multi level labeled security.

Current implementations exist to enforce a two man rule in the form of certain roles being assigned to a user by means of an identity and authentication, such as a user ID and password. However, this implementation still does not protect against a malicious user that obtains access to an authorized user's identity and authentication. In such a case, a malicious user may still be able to access a system to grant privileges to the malicious user without requiring interventions from or alerting any other authorized administrative users.

SUMMARY OF THE INVENTION

The illustrative embodiments provide a computer implemented method, apparatus, and computer usable program code for managing privileges on a data processing system. The process initiates a privilege monitor. All other entities in the data processing system are prevented from assigning privileges. The privilege monitor is the only entity authorized to assign privileges. The process monitors for requests of privileges. In response to detecting a request from a user for a privilege, the process selectively assigns the privilege to the user through the privilege monitor.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrating a dataflow when privileges are assigned by a super user in a current implementation;

FIG. 4 is a block diagram illustrating a data flow through a multi level system when a privilege monitor assigns privileges to an entity in accordance with an illustrative embodiment;

FIG. 7 is a flowchart illustrating a process for an entity to request a privilege from a privilege monitor in accordance with an illustrative embodiment; and FIG. 8 is a flowchart illustrating a process for granting access to privileged data and/or privileged processes based on a privilege granted to the entity in accordance with an illustrative embodiment.

DETAILED DESCRIPTION OF THE PREFERRED EMBODIMENT

Figure 1:
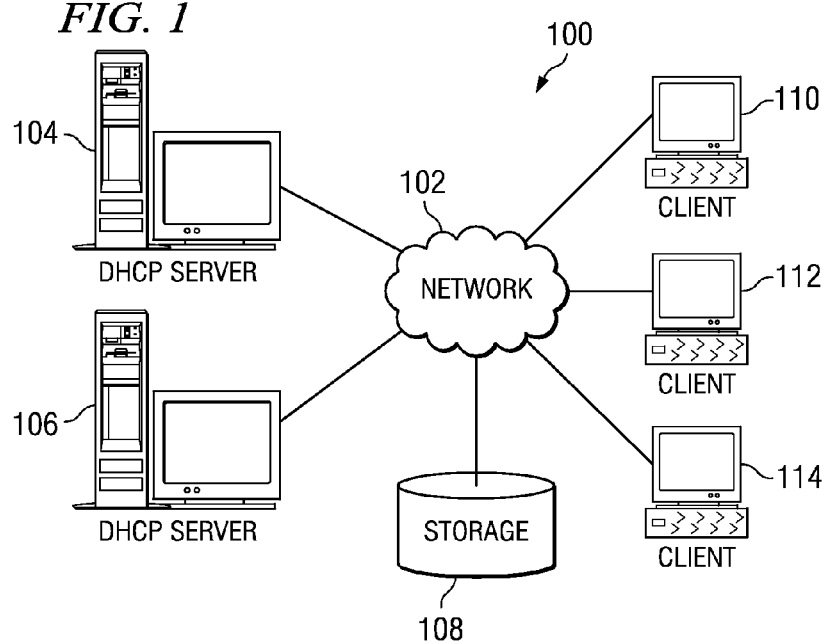
FIG. 1 is a pictorial representation of a network of data processing systems in which illustrative embodiments may be implemented.
Figure 2:
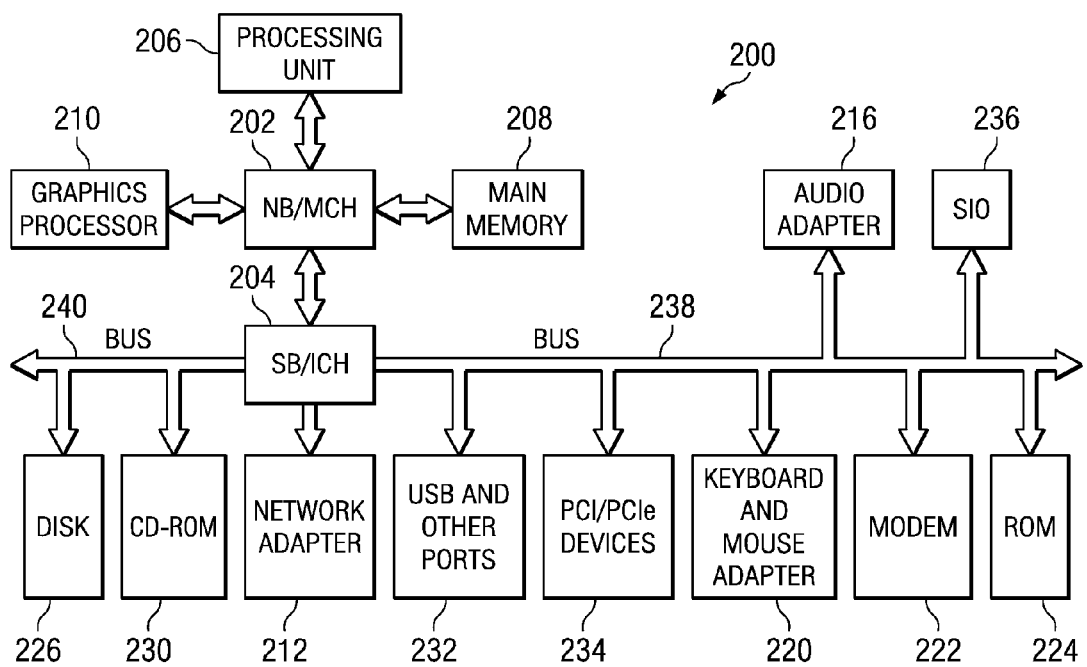
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system running on processing unit 206 coordinates and provides control of various components within data processing system 200 in FIG. 2. The operating system may be any commercially available operating system, including but not limited to, UNIX®, LINUX®, or any other known or available computer operating system. An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA or any pervasive computing device.

FIG. 3 is a block diagram illustrating a dataflow when privileges are assigned by a super user in a current (prior art) implementation. In current implementations, super user 300 is a special user account on a multi user computer system. Super user 300 has the ability to assign privileges and access to secure data and processes to any other user on the secure computer system, including super user 300. Super user 300 includes a super user, a root, a baron, an avatar, a toor, an information system security officer, or any other administrative user with the ability to assign privileges to other users and to super user 300. User 1 302, user 2 304, user 3 306, and user n 308 are users requesting privileges to access secure applications, processes, and/or data.

Multi level security is intended to prevent all administrative functions from being available to a single user. Thus, multi level security divides administrative functions among multiple users. However, in current implementations, the super user or information systems security officer, such as super user 300, can assign privileges to the super user's own processes, thereby bypassing the security checks of multi level security. In this manner, the purpose of multi level security to separate out the various administrative functions to protect the computer system from malicious users is defeated.

As used herein, a user includes, but is not limited to, a person, an organization, an application, an administrative account, or any other entity requesting or attempting to gain access to applications, processes, and/or data on a secure computer system. As used herein, a secure computer system is a computer system having a security system in place to secure privileged data, processes, and/or applications. In this example, secure computer system is a computer system in a multi level security environment. A privilege is a right to perform a certain action. Privileges are assigned to processes. Authorization is a mechanism to attain this right to perform restricted operations. Authorizations are assigned only to users. For example, a privilege may authorize a particular user to access a file system but limit a user's actions to read-only actions.

Thus, the illustrative embodiments recognize the need to enable the privilege access grantor to provide authorizations or privileges only to other users and not to the access grantor itself. Therefore, a mechanism is provided to prevent a malicious user from accessing a super user or information system security officer account to bypass security checks.

The illustrative embodiments provide a computer implemented method, apparatus, and computer usable program code for managing privileges on a data processing system. The process initiates a privilege monitor. The privilege monitor is the only entity authorized to assign privileges. All other entities in the data processing system are prevented from assigning privileges. The process monitors for requests of privileges. In response to detecting a request from a user for a privilege, the process selectively assigns the privilege to the user through the privilege monitor. In this example, the data processing system is a multi level system.

In one embodiment, the privilege monitor is a single purpose privilege monitor that is incapable of performing any job or activity associated with the data processing system other than granting privileges. When the privilege monitor grants a privilege to a user, the privilege monitor maps the privilege to the user. The privilege monitor maps a privilege to a user by adding an entry in a user role map. The entry identifies the user and the privilege.

In one example, the process determines if a privilege should be granted to a user based on a user role map. In response to receiving a request from a requesting user for access to privileged data, the process checks or inspects a user role map for privileges mapped to the requesting user. If the process determines that the requesting user is mapped to a privilege associated with the privileged data, the process grants the requesting user access to the privileged data in accordance with the privilege.

In another embodiment, the process maps a privilege to a user in response to a determination by the privilege monitor to grant the privilege to the user. If the process determines that a user requesting a privilege is an unauthorized user, the process logs the user requesting the privilege. In other words, the process creates a record or log of the privilege request from the unauthorized user.

FIG. 4 is a block diagram illustrating a data flow through a multi level system when a privilege monitor assigns privileges to an entity in accordance with an illustrative embodiment. Data processing system 400 is a data processing system, such as data processing system 100 in FIG. 1 and data processing system 200 in FIG. 2. Data processing system 400 is a data processing system in a multi level secure (MLS) environment.

User 402 is a user on data processing system 400. User can be a person, entity, application, authorized account, a role, such as an information system security officer, or any other type of user.

A privileged process or privileged data is a process or data that is restricted, such that the process or data can only be accessed or utilized by an authorized user with the proper authorization. A privilege is an authorization to access, use, update, modify, run, disable, or otherwise manipulate a given privileged process or privileged data.

User 402 requests a privilege, such as access to a privileged process or privileged data, by sending request 404 through user interface 406. In this example, request 404 is a request for privileged data. As used herein, privileged data includes, but is not limited to, privileged information, privileged applications, privileged processes, privileged actions or activities, and/or any other data that is protected or secured from use or accessibility by users without proper authorization. Thus, user 402 is a requester of a privilege.

User interface 406 is any type of known or available interface for providing input to data processing system 400, including but not limited to, a graphical user interface (GUI), a menu-driven interface, and/or a command line interface. In this illustrative example, user interface 406 is a role based access control (RBAC) interface for accessing privileged data and processes in a multi level security environment. User identification and authentication 407 receives request 404 through user interface 406.

User identification and authentication 407 is a software component for identifying and authenticating users. User identification and authentication 407 includes controller 408 for receiving requests for authorizations and privileges and sending privileges to authorized users.

Controller 408 is a software component associated with a privilege monitor entity, such as privilege monitor 410. Controller is a privilege monitor controller for controlling assignment of privileges through privilege monitor 410.

Privilege monitor 410 is an operating system entity with the authority to grant privileges to other users and user roles. However, privilege monitor 410 cannot grant privileges to the privilege monitor itself. In other words, privilege monitor 410 can grant privileges to any user except privilege monitor 410.

Controller 408 functions as a utility for providing privileges to requesting users, such as user 402, based on privileges granted by privilege monitor 410. Controller 408 enables privilege monitor 410 to provide privileges only to other users and not to privilege monitor 410 itself. Controller 408 is a software component for preventing bypassing security checks by an access grantor, such as privilege monitor 410. Controller 408 can be implemented using any programming language, including, but not limited to, C programming language, C++ programming language, Java, or any other known or available programming language.

Privilege monitor 410 is an operating system entity or authorized account for granting privileges to other users. Privilege monitor 410 is a special agent/entity that has been granted the job of assigning access privileges to other users. Privilege monitor 410 regulates only assignment of privileges to other users. However, privilege monitor 410 cannot grant privileges to itself, privilege monitor 410's own processes, or any role or roles derived from privilege monitor 410. In other words, in this example, privilege monitor 410 is single purpose. Privilege monitor 410 is not capable of performing any job or activity associated with data processing system 400 other than granting privileges to other users.

User role map 412 is an index mapping users and user roles to one or more privileges. If privilege monitor 410 grants a privilege to a user, such as privilege 414, controller 408 creates an entry in user role map 412 assigning the granted privilege to the given user or user role.

User role map 412 is stored in mapping database 416. Mapping database 416 is a database for storing information, such as privilege mapping data. Likewise, multi level secure database 418 is a database for storing privileged data, such as labeled data 420. In this example, databases 416 and 418 are located on or available locally to data processing system 400.

However, mapping database 416 and multi level secure database 418 may also be located remotely to data processing system 400, such as remote databases 422 on server 424. Remote databases 422 are any type of database for storing a collection of data that is not located on or locally to data processing system 400. In this illustrative example, remote databases 422 are located on server 424.

Server 424 is any type of server, such as server 104 and 106 in FIG. 1. Server 424 can be a server on a network, such as network 102 described in FIG. 1. Data processing system 400 accesses remote databases 422 on server 424 through a network connection via network device 426.

Network device 426 is any type of network access software known or available for allowing data processing system 400 to access a network. Network device 426 connects to a network connection, such as network 102 in FIG. 1. The network connection permits access to any type of network, such as a local area network (LAN), a wide area network (WAN), or the Internet.

Remote users 428 may also connect to data processing system 400 via network device 426. Remote users 428 can include any user or user role, including a remote privilege monitor. In such a case, request 404 for a privilege from user 402 is transmitted to the remote privilege monitor on server 424. If the remote privilege monitor grants the privilege, the privilege is transmitted back to data processing system 400 by server 424.

Thus, in this illustrative embodiment, user 402 requests authorization to access privileged data on data processing system 400 by sending request 404. Request 404 is received from user 402 through user interface 406.

Controller 408 checks user role map 412 to determine if user is mapped to the requested authorization. If user is already mapped to the requested authorization, user 402 is already authorized to access the requested privileged data. In such a case, privilege 414 is automatically granted to user 402.

If controller 408 determines that the requested privilege has not been mapped to one or more users in user role map 412, privilege monitor 410 determines if request 404 from user 402 is valid based on a need of user 402 for access to privileged data. If privilege monitor 410 determines that request 404 is not valid, privilege 414 is not granted. However, if privilege monitor 410 determines that request 404 is valid, controller 408 adds an entry into user role map 412 mapping granted privilege 414 to user 402. Controller 408 then grants access to user 402 to the privileged data by sending privilege 414 to user 402 via user interface 406. User 402 is then able to access the set of privileged data authorized by privilege 414. The set of privileged data can include authorization to perform one or more operations on privileged data, such as read-only, read and write, modify, update, disable a process, and/or any other operation that can be performed on data.

In accordance with one illustrative embodiment, the privilege monitor is a single purpose privilege monitor that is not capable of performing any job or activity associated with the data processing system other than granting privileges.

In this illustrative embodiment, the privilege monitor entity assigns privileges as a kernel space process. In this example, the privilege monitor is attached to or associated with a given user. In another illustrative example, the privilege monitor is a user-space process. In other words, the privilege manager is implemented in user space as opposed to the kernel space. The kernel space is utilized by the operating system kernel.

Figure 5:
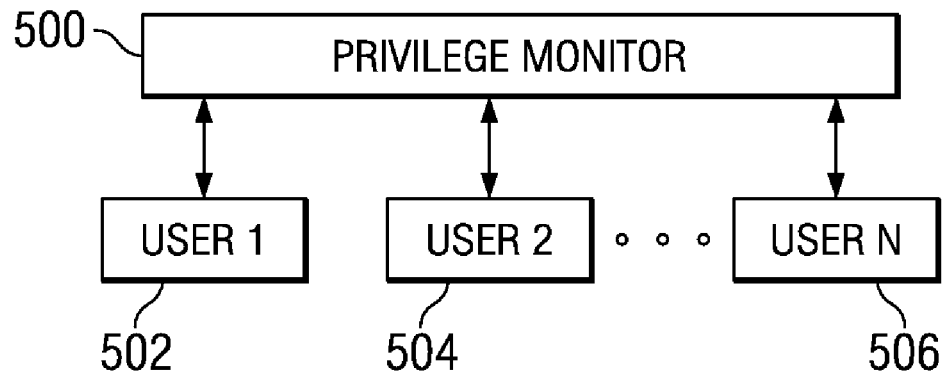
FIG. 5 is a block diagram illustrating a relationship between a privilege monitor and one or more other entities on a multi level system in accordance with an illustrative embodiment.

Turning now to FIG. 5, a block diagram illustrating a relationship between a privilege monitor and one or more other entities on a multi level system is shown in accordance with an illustrative embodiment. Privilege monitor 500 is a privilege monitor, such as privilege monitor 410 in FIG. 4. User 1 502, user 2 504, and user n 506 are users such as user 402 in FIG. 4. Users 502-506 can be any type of user, including an information systems security officer, a systems operator, a system administrator, a super user, a root user, or any other type of user.

In this illustrative example, privilege monitor is a privileged or special entity that can assign privileges to other users but cannot assign or grant privileges to privilege monitor 500. This adds an additional check on the user assigning privileges, privilege monitor 500, by permitting privilege monitor to assign privileges to any user, including users 502-506, but restricting privilege monitor 500 from bypassing security checks by assigning privileges to privilege monitor 500 itself.

When a user, such as users 502-506 access a data processing system on which privilege monitor 500 is implemented, the user is checked against a user role map to determine if privilege monitor 500 has granted the requested privilege to the user. However, privilege monitor 500 cannot grant privileges to privilege monitor 500 or roles derived from privilege monitor 500. Thus, even the information system security officer must go through the privilege monitor in order to obtain privileges.

The illustrative embodiments introduce a checkpoint for granting privileges through an agent, the privilege monitor. In one example, the privilege monitor is only able to grant privileges. The privilege monitor can perform no other system specific functions on a multi level secure system. In other words, the privilege monitor does not perform any other function than providing privileges to other existing users or user roles on the multi level secure system.

The monitoring agent, privilege monitor, can be enabled to function in similar fashion as an information system security officer and only provide privileges to users on request after validation on a need basis. The information system security officer's ability to provide privileges is disabled so that the privilege monitor is the only entity on the multi level secure system capable of granting privileges. This ensures that the privileges are assigned only when required. This process also enforces and/or mandates monitoring of activities by more than one person. In other words, a malicious user now will need to access both the privilege monitor and the information system security officer/super user to cause significant damage to the system. In this illustrative embodiment, the process is implemented in a multi level secure environment.

Figure 6:
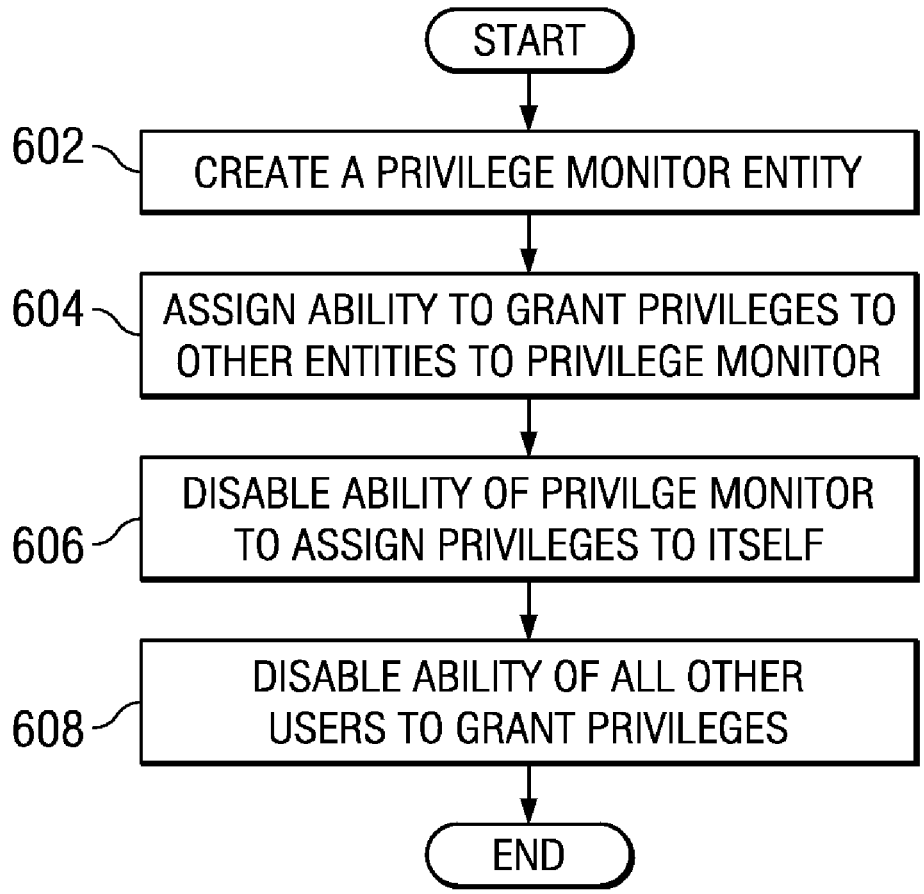
FIG. 6 is a flowchart illustrating a process for creating a privilege monitor entity in accordance with an illustrative embodiment.

FIG. 6 is a flowchart illustrating a process for creating a privilege monitor entity in accordance with an illustrative embodiment. The process is performed by an agent, an entity, a user, or a process for generating a privilege monitor. In this illustrative example in FIG. 6, the process is implemented by a component for identifying and authenticating users, such as user identification and authentication 407 in FIG. 4. This process could be implemented either in the kernel space or the user space.

The process begins by creating a privilege monitor agent or entity (step 602). The privilege monitor agent is attached to a user or associated with a user. Next, the process assigns the ability to grant or assign privileges to other entities to privilege monitor (step 604). In other words, the privilege monitor is given the sole job of granting authorizations to other users.

The process disables the ability of privilege monitor to assign privileges to itself (step 606). In other words, the privilege monitor can only assign authorizations to other users but never to self. This provides an additional layer of protection against any malicious user that may gain access to privilege monitor. Although the malicious user may be able to alter privileges for other users, the malicious user would have to gain access to one or more additional user accounts in order to grant privileges to the malicious user because privilege monitor cannot grant privileges to itself.

Finally, the process disables the ability of all other users to grant or assign privileges (step 608) with the process terminating thereafter. In this manner, a malicious user must hack into the accounts of multiple users in order to assign privileges to the malicious user.

Referring now to FIG. 7, a flowchart illustrating a process for an entity to request a privilege from a privilege monitor is shown in accordance with an illustrative embodiment. The process is implemented by a software component for granting privileges. In this illustrative example, the process is implemented by controller 408 in FIG. 4.

The process begins by receiving a request for a privilege from a user requester (step 702). The process makes a determination as to whether to grant the privilege (step 704). This determination is made based on a decision made by a user assigned to the privilege monitor agent, such as privilege monitor 410 in FIG. 4 and privilege monitor 500 in FIG. 5.

If the process determines that the privilege should not be granted, the process terminates thereafter. If the process determines that the privilege should be granted, the process maps the privilege to the user requester (step 706) with the process terminating thereafter. The process maps the user to privilege by adding an entry in a privilege mapping index to indicate that the privilege has been granted to the user or user's role.

FIG. 8 is a flowchart illustrating a process for granting access to privileged data and/or privileged processes based on a privilege granted to the entity in accordance with an illustrative embodiment. In the illustrative example shown in FIG. 8, the process is implemented by a software component for assigning privileges to a user, such as controller 408 in FIG. 4.

The process begins by receiving a request to access privileged data (step 802). The process checks a user role map (step 804) to make a determination as to whether the user has privileges to access the requested data (step 806). In other words, the process checks a user role map for privileges mapped to the requesting user in response to receiving a request from a requesting user for access to privileged data.

If the user does not have privileges to the requested data, the process denies access to the user (step 808) with the process terminating thereafter.

If the user role map indicates that the user or the user's role is mapped to privileges for accessing the requested data, the process grants access to the requested data (step 810) in accordance with the privilege associated with the privileged data, with the process terminating thereafter.

The illustrative embodiments provide a computer implemented method, apparatus, and computer usable program code for managing privileges on a data processing system. The process initiating a privilege monitor, wherein all other entities in the data processing system are prevented from assigning privileges, and wherein the privilege monitor is the only entity authorized to assign privileges. The process monitors for requests for privileges. In response to detecting a request from a user for a privilege, the process selectively assigns the privilege to the user through the privilege monitor.

The privilege monitor is adapted to assign privileges only to other entities. The process disables an ability of the privilege monitor to assign privileges to the privilege monitor itself. The process also disables an ability of all other entities to assign privileges. The privilege monitor is the only entity authorized to assign privileges.

Thus, the illustrative embodiments provide a mechanism to strengthen security in multi level secure systems by introducing a monitoring agent, privilege monitor, which can only grant privileges and perform no other functions. This provides a checkpoint for granting privileges. This permits stronger and finer levels of security in a labeled system without allowing loopholes in granting of privileges and authorizations.

In this manner, the system cannot be compromised without the connivance of all system administrative users. An attacker will have to break into two or more authorized roles and entities including the privilege monitor, to be able to successfully subvert the system. In one embodiment, an attacker must break into or obtain unauthorized access to all authorized roles, including the privilege monitor, to be able to successfully subvert the system. This process is especially useful in securing data in organizations having a greater need for security, such as banks, defense systems, hospitals, and any other computer systems having sensitive data.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing privileges on a data processing system that is a multi level security system, the computer implemented method comprising:
   including a role-based access control interface;
   including a privilege monitor that is separate and apart from the role-based access control interface, wherein all other entities in the data processing system including the role-based access control interface are prevented from assigning privileges, and wherein the privilege monitor is the only entity authorized to assign privileges;
   monitoring, by one or more processors, for requests for privileges; and
   responsive to detecting, by the one or more processors, a request from a user for a privilege, selectively assigning the privilege to the user through the privilege monitor, wherein assigning privileges by the privilege monitor is a kernel space process, wherein the privilege monitor is associated with the user.

2. The computer implemented method of claim 1 wherein selectively assigning further comprises:
   responsive to detecting the request, determining whether the user is authorized for the privilege; and
   responsive to the user being authorized for the privilege, assigning the privilege to the user.

3. The computer implemented method of claim 2 further comprising:
   logging the user requesting the privilege and the request in a log if the user is not authorized for the privilege.

4. The computer implemented method of claim 1 further comprising:
   receiving, by the role-based access control interface, the request;
   sending, by the role-based access control interface, the request to a user identification and authentication component, wherein the user identification and authentication component includes the privilege monitor and a controller;
   responsive to the user being authorized for the privilege, granting the privilege to the user using the privilege monitor; and
   creating, by the controller, an entry in a user role map that assigns the privilege to the user.

5. The computer implemented method of claim 1 wherein the privilege monitor is a single purpose privilege monitor that does not perform any job or activity associated with the data processing system other than granting privileges.

6. The computer implemented method of claim 1, further comprising:
   disabling an information system security officer's ability to assign any privileges, wherein the information system security officer is included in the role-based access control interface; and
   disabling a privilege monitor's ability to assign privileges to the privilege monitor.

7. The computer implemented method of claim 1 further comprising:
   responsive to a determination by the privilege monitor to grant the privilege to the user, mapping the privilege to the user.

8. The computer implemented method of claim 7 wherein mapping the privilege to the user further comprises:
   adding an entry to a user role map, wherein the entry identifies the user and the privilege.

9. The computer implemented method of claim 1 further comprising:
   responsive to receiving a request from a requesting user for access to privileged data, inspecting a user role map for privileges mapped to the requesting user;
   responsive to a determination that the requesting user is mapped to a privilege associated with the privileged data, granting the requesting user access to the privileged data in accordance with the privilege.

10. A computer program product comprising:
a non-transitory computer usable medium including computer usable program code for managing privileges in a data processing system that is a multi level security system, said computer program product including:
computer usable program code for including a role-based access control interface;
computer usable program code for including a privilege monitor that is separate and apart from the role-based access control, wherein all other entities in the data processing system including the role-based access control interface are prevented from assigning privileges, and wherein the privilege monitor is an only entity authorized to assign privileges;
computer usable program code for monitoring for requests for privileges; and
computer usable program code for responsive to detecting a request from a user for a privilege, selectively assigning the privilege to the user through the privilege monitor, wherein assigning privileges by the privilege monitor is a kernel space process, wherein the privilege monitor is associated with the user.

11. The computer program product of claim 10, further comprising:
computer usable program code for receiving, by the role-based access control interface, the request;
computer usable program code for sending, by the role-based access control interface, the request to a user identification and authentication component, wherein the user identification and authentication component includes the privilege monitor and a controller;
computer usable program code responsive to the user being authorized for the privilege, for granting the privilege to the user using the privilege monitor; and
computer usable program code for creating, by the controller, an entry in a user role map that assigns the privilege to the user.

12. The computer program product of claim 10 wherein the privilege monitor is single purpose privilege monitor that is not capable of performing any job or activity associated with the data processing system other than granting privileges.

13. The computer program product of claim 10 further comprising:
computer usable program code for mapping the privilege to the user in a user role map in response to a determination by the privilege monitor to grant the privilege.

14. The computer program product of claim 10 further comprising:
computer usable program code for determining whether the user is authorized for the privilege in response to detecting the request; and
computer usable program code for assigning the privilege to the user in response to the user being authorized for the privilege.

15. The computer program product of claim 10, further comprising:
computer usable program code for disabling an information system security officer's ability to assign any privileges, wherein the information system security officer is included in the role-based access control interface; and
computer usable program code for disabling the privilege monitor's ability to assign privileges to the privilege monitor.

16. A data processing system apparatus, which is a multi-level security system, the data processing system apparatus comprising:
a bus system;
a communications system connected to the bus system;
a memory connected to the bus system, wherein the memory includes computer usable program code; and
a processing unit connected to the bus system, wherein the processing unit executes the computer usable program code to include a role-based access control interface; include a privilege monitor that is separate and apart from the role-based access control interface, wherein all other entities in the data processing system including the role-based access control interface are prevented from assigning privileges, and wherein the privilege monitor is the only entity authorized to assign privileges; monitor for requests for privileges; and selectively assign the privilege to a user through the privilege monitor, in response to detecting a request from the user for a privilege, wherein assigning privileges by the privilege monitor is a kernel space process, wherein the privilege monitor is associated with the user.

17. The apparatus of claim 16, further comprising:
the processing unit executing the computer usable program code to receive, by the role-based access control RBAC interface, the request; send, by the role-based access control interface, the request to a user identification and authentication component, wherein the user identification and authentication component includes the privilege monitor and a controller; responsive to the user being authorized for the privilege, grant the privilege to the user using the privilege monitor; and create, by the controller, an entry in a user role map that assigns the privilege to the user.

18. The apparatus of claim 16 wherein the privilege monitor is single purpose privilege monitor that is not capable of performing any job or activity associated with the data processing system other than granting privileges.

19. The apparatus of claim 16, further comprising:
the processing unit executing the computer usable program code to disable an information system security officer's ability to assign any privileges, wherein the information system security office is included in the role-based access control interface; and disable a privilege monitor's ability to assign privileges to the privilege monitor.

* * * * *